Figure 5:
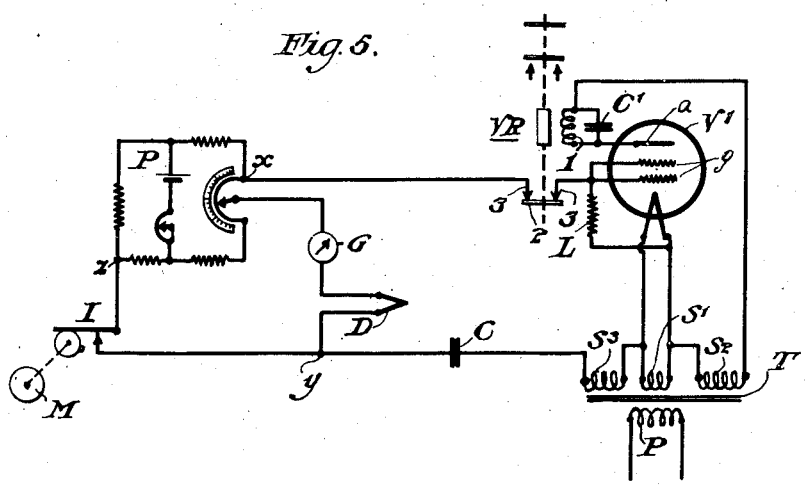

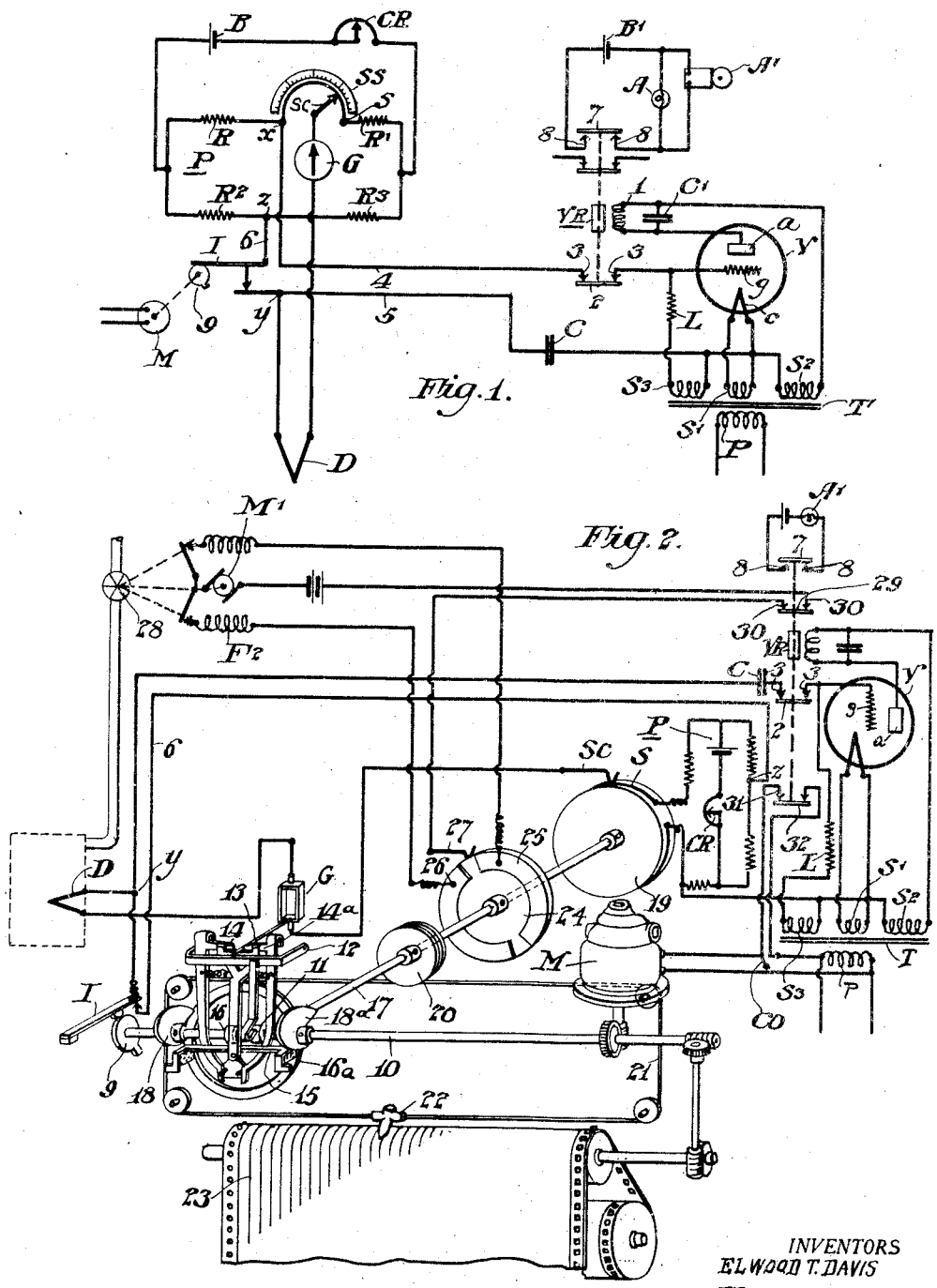

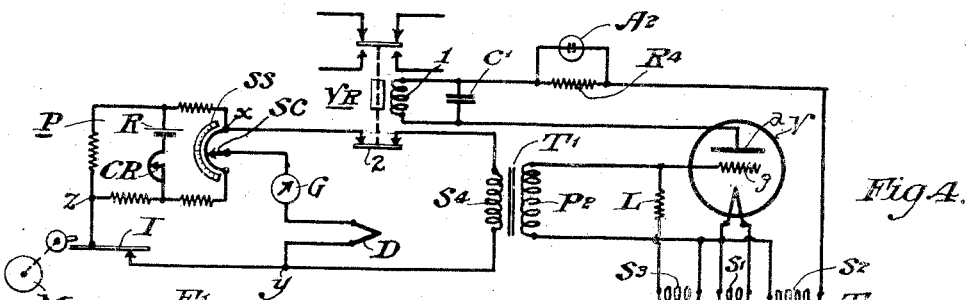
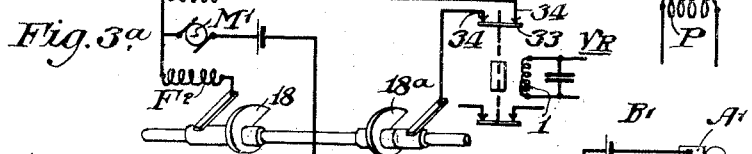
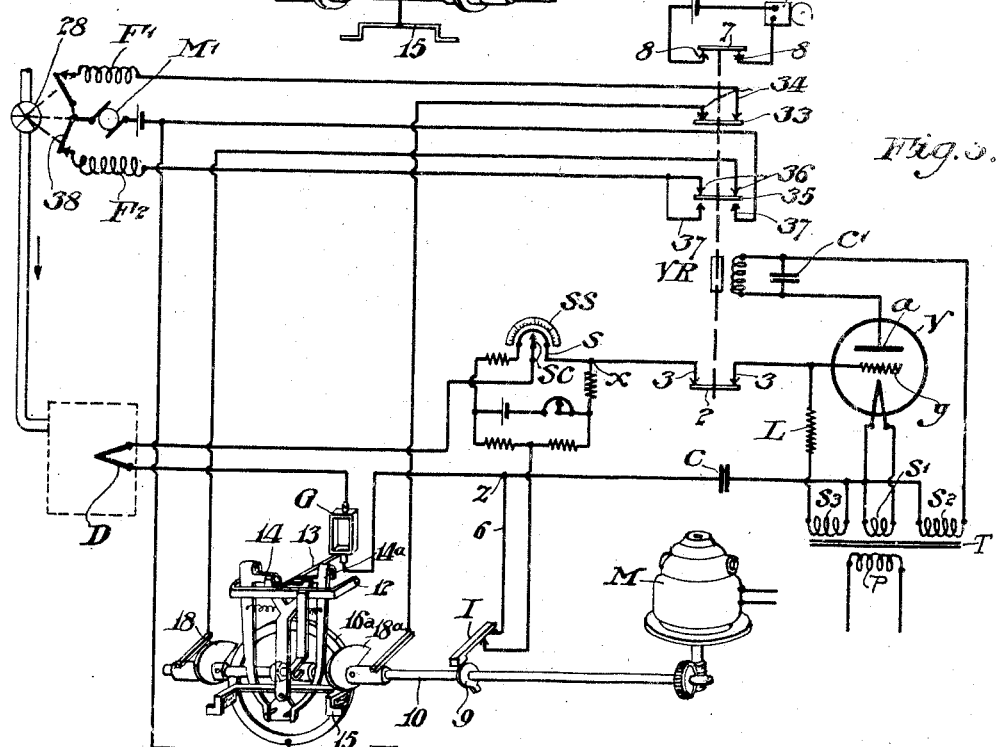
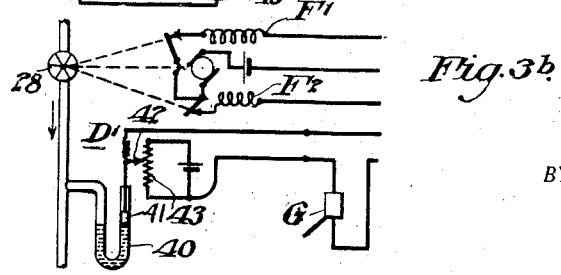

INVENTORS
ELWOOD T. DAVIS
FELIX WUNSCH
BY
ATTORNEY

Patented Apr. 11, 1939

2,154,065

UNITED STATES PATENT OFFICE 2,154,065

ELECTRICAL MEASURING SYSTEM

Elwood T. Davis, Upper Darby, and Felix Wunsch, Philadelphia, Pa., assignors to Leeds & Northrup Company, Philadelphia, Pa., a corporation of Pennsylvania Application August 7, 1935, Serial No. 35,062

33 Claims. (Cl. 236—70)

Our invention relates to electrical measuring systems for recording or controlling the magnitude or changes in magnitude of a condition.

In accordance with our invention, there is associated with the measuring system a supervisory system including a tube which responds, when the measuring system becomes inoperative or deranged, to provide an indication of the inoperativeness and/or to modify the operative relation between the measuring system and regulating apparatus normally controlled thereby.

More specifically, and in some forms of our invention, a source of biasing voltage for an input electrode of the tube is normally shunted by the measuring system, or a part thereof, to establish an effective bias of magnitude permitting flow of substantial anode current. When, however, there is change in the impedance in the measuring system, corresponding to its complete or partial inoperativeness, the biasing voltage changes to such magnitude that the anode current is substantially reduced to control, for example, an alarm device and/or to operate, or render inoperative, regulating apparatus normally operated by the measuring system.

Our invention further resides in the features of combination and arrangement, hereinafter described.

For an understanding of our invention and for illustration of various forms thereof, reference is to be had to the accompanying drawings in which:

Figure 1 is a wiring diagram for apparatus embodying the invention;

Fig. 2 schematically illustrates a recorder-controller apparatus connected in accordance with Fig. 1;

Fig. 3 schematically illustrates control apparatus connected in accordance with Fig. 1;

Figs. 3a, 3b, 4, 5 and 6 are wiring diagrams of modifications of the invention.

Referring to Fig. 1, the measuring system comprises a potentiometer network P, a galvanometer G, and a thermocouple D. The resistance CR in circuit with the source of current B and the potentiometer network P is variable to adjust the current through the slidewire resistance S of the potentiometer to the value for which the scale SS is calibrated. The galvanometer G and the thermocouple D are connected in series between the point z of the potentiometer and the slidewire contact SC. The contact SC is adjusted with respect to the slidewire S, either manually or preferably automatically by apparatus hereinafter described, to produce a zero deflection of the galvanometer indicative of balance of the voltage produced by the thermocouple D and the effective voltage of the slidewire between the point x and the slidewire contact. When the balance is obtained, the position of the adjustable element of the slidewire with respect to the scale SS indicates the magnitude of the temperature or other condition to which the thermocouple D is responsive. Upon a change in temperature, for example, the voltage produced by the thermocouple increases or decreases and the galvanometer G deflects in one sense or the other to indicate the unbalance. Balance is restored by again adjusting the slidewire contact relative to the slidewire until the galvanometer deflection is again zero.

With the arrangement as thus far described, if the thermocouple D should burn out, or if for any reason there should be an open circuit between the points z and x in the path including the thermocouple, galvanometer, the slidewire contact and the slidewire to the point x, there would be no deflection of the galvanometer G, and apparently the system would be in balance, although actually deranged or inoperative for its intended purpose. In some cases, the fault, for example, a broken galvanometer suspension, may cause the galvanometer pointer to deflect from neutral and cause a recording or control action which is not representative of or properly related to the actual magnitude of the condition under measurement.

While, for purpose of illustration, the measuring system is shown to be a potentiometer network and to include a thermocouple, it is to be understood that the same defects are inherent in other systems, particularly those using the null method of measurement, and our improvements, now described, are applicable to systems other than the one specifically shown for purposes of explanation. In general, our invention contemplates a supervisory system including a control tube which is not responsive to the changes in magnitude of the condition being measured, but which responds when the measuring system becomes inoperative. Specifically, and in the system shown in Fig. 1, the grid g of the control tube V is connected to the point x of the measuring network, and the cathode c of the tube is connected to the point y of the measuring circuit, preferably through a condenser C. The secondary S3 of a transformer T whose primary P is connected to a suitable source of alternating current, for example, a 110 volt line, such as used for lighting and power, is connected between the cathode c and grid g of tube V in series with the impedance L which may be either a substantially pure resistance or a resistance having substantial reactance. The secondary S1 of transformer T is used to heat the cathode c of the tube to electron-emission temperature. The secondary S2 of the transformer is connected between the cathode c and anode a of the tube V. The anode circuit of the tube includes the winding 1 of a relay VR which may have a movable contact 2 for engaging contacts 3, 3 to complete one of the connections between the input circuit of the tube and the measuring network.

The voltage produced by the secondary S3 is capable of biasing the grid g to such a value that the resulting anode current flowing through coil 1 is insufficient to hold the relay armature against the action of a spring, not shown, or gravity. However, the input circuit of the tube is normally shunted by the measuring system to modify the effective grid-biasing voltage to such extent that the anode current is sufficient to hold the armature. Specifically, between the conductors 4 and 5 there are several shunt paths provided by the measuring system; one path, beginning at point $x$, includes the portion of the slidewire from point $x$ to the slidewire contact SC, the galvanometer G and the thermocouple D; the other path between points $x$ and $y$ includes the interrupter I between points $y$ and $z$; the portion of the path between $x$ and $z$ divides into two branches, one including R and R2, and the other including R1, R3 and S.

When the circuit is in operative condition and the interrupter I closed, the joint impedance of the measuring network across conductors 4 and 5, in parallel with the grid-cathode impedance of the tube, is so low compared to that of impedance L that the effective grid-biasing voltage permits sufficient anode current to flow through coil 1 of the relay VR to hold the armature and maintain the relay contacts in the position shown in Fig. 1. Assuming, however, that there is an open circuit between the points $x$ and $y$, due, for example, to a burned-out thermocouple or galvanometer, a broken thermocouple lead, a broken galvanometer suspension, a broken slidewire, poor engagement between the slidewire and slidewire contact, etc., and that the interrupter I is in open-circuit position, the impedance between the conductors 4 and 5 is high and the effective biasing voltage produced by the secondary S3 changes to such extent that the anode current is substantially reduced or cut-off, whereupon the armature of the relay moves to its biased position. The response of the relay may be utilized to give an indication or alarm that the measuring apparatus is inoperative or, more specifically, that the zero deflection of the galvanometer is not due to balance of a measuring system but rather to a fault or defect. As indicated in Fig. 1, the relay may be provided with a contact 7 adapted, when coil 1 is deenergized, to engage contacts 8, 8 to complete a circuit including a source of current B1 and one or more signal devices, as signal light A or the bell or buzzer A1.

It is also to be noted that a failure in any part of the supervisory system, for example, burn-out of the cathode or heater of the tube, or failure of the source of current-supplying transformer T, etc., causes the relay to give an alarm.

Preferably and as indicated, the interrupter I is intermittently operated as by a cam 9 driven from motor M or other suitable source. The interrupter I is preferably opened, at suitably short intervals, for example, two seconds, so that the operator is substantially immediately advised of the failure of the measuring system. When the interrupter is closed, the relay does not respond even though there is an interruption in the measuring circuit from $x$ to $y$ through the galvanometer G and thermocouple D because, as can be traced from the diagram, there are other shunt paths provided by the measuring network between the conductors 4 and 5. When the interrupter I is opened, only that portion of the measuring system between points $x$ and $y$, including the galvanometer and thermocouple, are connected in shunt to the input circuit of the tube, and if this portion of the measuring system be open for any reason, the effective grid voltage impressed in the tube changes, as above described, to effect operation of the alarm.

The adaptation of the fundamental system of Fig. 1 to a recorder-controller system is shown in Fig. 2. The recorder-controller apparatus, which is generally of the type shown in the Leeds Patent No. 1,125,699 and Squibb Patent No. 1,935,732, comprises the galvanometer G connected, as shown in Fig. 1, in circuit with a thermocouple D or other device capable of producing a voltage which varies as a function of the condition under measurement, and a potentiometer network P, or equivalent measuring circuit. The motor M continuously drives the shaft 10 to which is secured the cam 11 for intermittently rocking the frame 12. When the pointer 13 of the galvanometer is deflected from its neutral position, due to unbalance of the measuring system, it engages one or the other of the arms 14, 14a to effect displacement of the driving clutch member 15 from its neutral position in one direction or the other, depending upon the sense of unbalance of the network. Thereafter, during continued rotation of shaft 10, the cam 16 permits engagement between the driving clutch member 15 and the driven clutch member 16a on the end of shaft 17. Thereafter, and while the clutch members remain in engagement, one or the other of the cams 18, 18a driven by shaft 10 engages the driving clutch member 15 and returns it to its neutral position, and since the clutch members are in engagement during this time, the shaft 17 is rotated in a sense initially determined by the sense of unbalance of the network and to an extent which is the greater the greater the extent of unbalance. For a more complete description of the construction and operation of the mechanical relay between galvanometer G and the control shaft 17, reference is made to the aforesaid Leeds and Squibb patents.

Upon the disk 19, secured to shaft 17, is mounted the slidewire S of the measuring circuit so that movement of shaft 17, in response to deflection of the galvanometer, moves the slidewire with respect to the contact SC in proper sense to restore balance between the effective voltage of the slidewire and the thermocouple D or equivalent. In brief, assuming the thermocouple voltage changes, the galvanometer G deflects to effect a rebalancing adjustment of the slidewire, whereupon the pointer 13 resumes its neutral position. The pulley 20, mounted on the shaft 17, may be connected, as by cord 21, to the marker 22 associated with the recorder chart 23 driven from motor M. As shaft 17 is moved in one direction or the other, the marker 22 is correspondingly moved transversely of the recorder chart. So long as the temperature is at a fixed value, the marker therefore traces a straight line. However, if for any reason the measuring circuit becomes open, due, for example, to a burn-out of the thermocouple or any other cause, including those above mentioned, the galvanometer may remain in neutral position and the record improperly appears as a straight line, notwithstanding changes in the measured condition subsequent to the burn-out.

However, in accordance with the arrangement of Fig. 1, the measuring circuit is included in the input circuit of the control tube V so that if there is any interruption of the measuring circuit between the points x and y, the operator is substantially immediately advised by suitable signal or alarm.

As shown in Fig. 2, the cam 9 for periodically breaking the circuit between the points y and z is on the shaft 10 of the recorder controller and is preferably so shaped that the interrupter I is moved to open-circuit position during that portion of the cycle of the apparatus when the needle 13 is engaged or clamped by the bar 12 or equivalent, thus avoiding possible disturbances of the galvanometer G due to operation of interrupter I.

With the arrangement shown in Fig. 2, the rebalancing adjustment of the measuring network has no effect upon the control tube, and the control tube and its associated circuits and apparatus have no effect upon the normal functioning of the recorder-controller. However, for each cycle of operation of the recorder-controller, the interrupter I so correlates the supervisory system to the measuring system that if there has occurred any failure of the thermocouple and galvanometer portion of the measuring system, the supervisory system gives warning.

When the relay VR is deenergized, the contact 2 interrupts the connection between the tube V and the measuring circuit until an operator, after having corrected the fault in the measuring circuit, again moves the contact 2 into engagement with contact 3. If desired, the contact 2 may be omitted and the grid g permanently connected to the point y, in which case relay VR automatically resets when the fault in the measuring circuit has been corrected.

With the arrangement shown in Fig. 2, there may also be disposed upon the shaft 17 a disk 24 carrying the contacts 25 and 26 which cooperate with the stationary contact 27 to provide a reversing switch for the motor MI which, in the particular arrangement shown, controls the valve 28 which regulates the temperature to which the thermocouple D responds. When the temperature increases or decreases from the desired value, the shaft 17 is rotated, as above described, bringing one or the other of the contacts 25, 26 into engagement with contact 27 to effect rotation of motor MI in proper direction to return the temperature toward the desired value. When the control tube V responds to an inoperative condition of the measuring system, the regulating motor MI is disconnected from the control switch 25, 26, 27 to prevent its further operation in the event that, at the time of failure of the measuring system or one of its components, the contact 27 is in engagement with either of contacts 25, 26. As shown in Fig. 2, the conductor extending to contact 27 is completed by movable contact 29 of relay VR only so long as the relay is energized. When, for example, the thermocouple burns out and the anode current of the control tube V consequently falls to a value insufficient to hold the armature of the relay, the contact 29 separates from the contacts 30 to prevent any further operation of the motor MI. Preferably, as in the system of Fig. 1, an alarm is also given at the same time to warn an operator that the automatic control is no longer functioning. If desired, the control tube, instead of simply preventing operation of the regulating motor MI may, as hereinafter appears, effect operation of the motor MI to a safety or standby position, or permit its operation for only one sense of deflection of the pointer.

If desired, provision may also be made to stop the recorder-controller in event it may become inoperative; for example, there may be included in series with the motor M a switch comprising the fixed contacts 31, 31 and movable contact 32 of relay VR to interrupt the motor circuit when the raly VR is deenergized or insufficiently energized, as above described. These contacts may be effectively excluded by closure of switch CO in shunt thereto.

In the system shown in Fig. 3, the slidewire contact SC is manually adjustable with respect to the slidewire to predetermine the temperature at which the measuring system is in balance. If the temperature departs from this desired magnitude, the voltage produced by the thermocouple increases or decreases causing galvanometer G to deflect and to effect displacement of the driving clutch member 15 from neutral position. In this modification, the restoring cams 18, 18a are insulated from each other and from shaft 10 and serve as contacts of a reversing switch for controlling the regulating motor MI. When member 15 is displaced in one direction from its neutral position, it is engaged by cam 18a which, in restoring the member 15 to neutral position, completes a circuit through one of the field windings of the motor MI for a period substantially proportional to the deflection of the galvanometer. Conversely, if the member is deflected in an opposite sense, it is engaged by cam 18 to complete a circuit through the other winding of the regulating motor and for a period corresponding to the galvanometer deflection. The circuit from the field winding F1 to cam 18a is normally completed by engagement of relay contact 33 with the fixed contacts 34, and the circuit from field winding F2 to cam 18 is normally completed by engagement of relay contact 35 with the fixed contacts 36. When, however, the measuring circuit becomes inoperative, as above described, to effect operation of the relay VR, the circuits to the reversing switch 15, 18, 18a are interrupted to preclude further operation of the motor MI by the controller. When the relay is deenergized, the contact 35 moves into engagement with contacts 37 to complete a circuit through the armature and field F2 of the motor MI to effect its operation in the proper direction to close valve 28 and thus reduce the temperature in the oven or furnace to which the thermocouple D responds. A limit switch 38 operated by the valve, when it attains a predetermined position, interrupts the motor circuit when the valve has been moved to a desired "safe" position. As in the preceding modification, the relay VR may also be provided with contacts 7, 8 for operating an alarm circuit to warn an operator that the apparatus is no longer under automatic control.

If desired, operation of the relay VR may interrupt only the circuit to the field F1 of the motor, as shown in Fig. 3a, in which event, when the measuring system becomes inoperative, it cannot effect operation of the control motor MI to increase temperature though it can, if the pointer for any reason deflects or remains deflected away from neutral on the "high" temperature side, the motor M will operate valve 28 to reduce the temperature. In other words, the relay VR does not prevent a safe operation of the valve by the measuring system when it becomes inoperative. In Fig. 3a, only the elements directly concerned with the circuit change are shown since the remainder of the system may be the same as in Fig. 3 or Fig. 1.

In the regulation of the pressure of fuel or illuminating gas, it is desirable that the pressure be increased to a predetermined maximum in event of failure of the measuring or supervisory system. This result can be accomplished simply by changing the connections between the motor windings and relay contacts 33 to 37 so that contacts 33, 34 control the "lower" winding F2 and contacts 35 to 37 control the "raise" winding F1. Any suitable device may be used to provide a voltage varying as a function of the gas pressure. For example, as shown in Fig. 3b, it may comprise a manometer 40 having a float 41 for moving a contact 42 relative to a potentiometer slidewire 43. The effective output voltage of device D' is balanced by adjustment of contact SC of potentiometer P, as in the other modifications.

By way of example, the tube V of Figs. 1 to 3 may be of the UX-245 type, in which event the impedance L may have a value of from about .1 to 3.5 megohms; the open circuit output voltage of secondary S3 may be about 20 volts; the output voltage of secondary S2 about 90 volts; and condenser C may have a capacitance of about .1 microfarad. The condenser C1 in parallel to the relay coil 1, to smooth out the current fluctuations and prevent the relay from chattering, may have a value of about 2 microfarads. The purpose of condenser C is to prevent flow in the measuring circuit of the direct current generated in the input circuit of the tube by rectification.

In the modification of my invention shown in Fig. 4, the measuring circuit is associated with the control tube V by the transformer T1 whose primary P2 is connected between the grid and cathode of the tube and whose secondary S4 is connected between the points $x$ and $y$ of the measuring circuit. So long as the measuring circuit is in operative condition, the joint impedance of the primary circuit of the transformer in parallel with the grid-cathode impedance of the tube is low compared to that of impedance L and, therefore, as in the system of Fig. 1, the effective grid voltage permits flow of sufficient anode current to maintain relay VR energized. When, however, the switch or interrupter I is open, and there is an open circuit between the points $x$ and $y$ in the path including the slidewire, galvanometer G and thermocouple D, the primary circuit exhibits high impedance and therefore the voltage impressed on the grid of the tube V changes, causing the plate current to drop to such value that the armature of the relay moves to its biased position to effect operation of a signal, as in Figs. 1 and 3, and/or to disconnect the regulating motor from the measuring circuit, and/or to effect or permit operation of the regulating motor to a "safe" position.

In this modification of the invention, the contact 2 of relay VR, if utilized, is included in the secondary circuit of the transformer. In this or other systems herein described, the signal may be of a negative type; for example, as shown in Fig. 4, so long as the anode current is sufficiently high the drop in voltage across the resistance R4 is sufficiently great to cause a glow discharge in the signal tube A2. When, however, the system becomes inoperative, as above described, the voltage drop across the resistance is too low to maintain the glow discharge and its absence serves as a warning of inoperativeness of the measuring circuit. The circuit arrangement of Fig. 4 may be used with the recording and controlling apparatus of Figs. 2 and 3. The transformer T1 of Fig. 4 serves generally the same purpose as the condenser C of Figs. 1 to 3, since it isolates the measuring circuit from the input circuit of the tube V insofar as flow of rectified direct current is concerned.

The arrangement shown in Fig. 5 is suitable when the control tube is of a type such as UX-246 of which it is characteristic that the anode current is insubstantial when the cathode and grid structures are at substantially the same potential. In this modification, the secondary S3 is connected between the grid and cathode of the tube in series with the measuring circuit and the condenser C, or equivalent. So long as the measuring circuit is continuous between the points $x$ and $y$, the alternating potential impressed on the input electrodes of the tube causes flow of anode current which is sufficient to hold the relay armature in its normal position. When, however, the circuit is interrupted between the points $x$ and $y$, and switch I is open, there is no longer any excitation from the secondary S3 and the grid and cathode potential become substantially the same. Consequently, the anode current is reduced to a negligible value to given an alarm or effect a control, as in any of the preceding modifications. It is characteristic of the systems shown in Figs. 4 and 5, as well as that of Fig. 1, that any failure in the supervisory system also gives an indication or effects control preventing occurrence of any dangerous operating condition.

Figure 6:
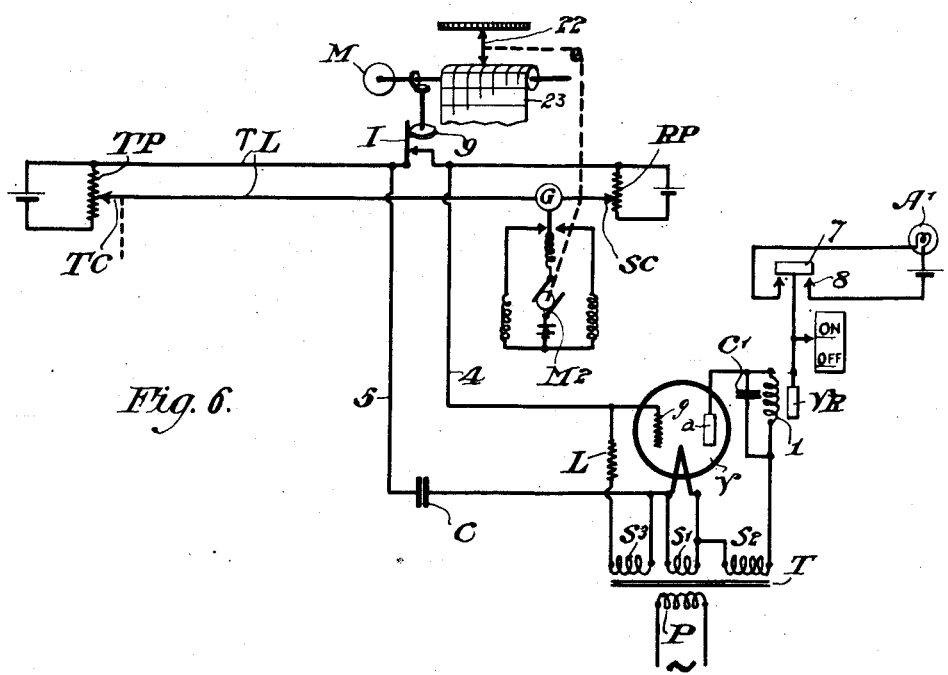

Our invention is also suited for use with electrical telemetric systems. Referring to Fig. 6, the transmitting station, including the potentiometer TP, or equivalent, is connected to the receiving station including potentiometer RP, or equivalent, by the transmission line TL whose continuity is essential to operativeness of the telemetric system. The contact TC is suitably mechanically connected to the movable element of a condition-responsive device, for example, as a float for measurement of fluid level, a diaphragm for measurement of pressure, etc., and contact SC of the receiving slidewire is actuable in response to deflections of galvanometer G to balance the network. The mechanism for operating the contact SC and the recording and/or indicating element 22 may comprise a mechanical relay, as in Figs. 2 and 3, or may comprise a reversible motor M2 controlled by galvanometer G, as shown in Fig. 6.

The interrupter I, which is intermittently operated as in prior modifications, is included in series in the transmission line TL. So long as the line is continuous, and whether interrupter I is open or closed, the impedance between conductors 4 and 5 is of such value that the anode current of tube V of the supervisory system is sufficient to maintain relay VR energized. If, however, the transmission line is broken, there is a substantial change in impedance of the path across conductors 4, 5 when the interrupter I is next opened and consequently the effective grid voltage changes in such sense and extent that the anode current is reduced below the value necessary to hold the relay armature. The relay or equivalent may then, as in prior modifications, produce or afford a suitable signal or indication of inoperativeness.

While we have illustrated preferred modifications, it is understood our invention is not limited thereto but is coextensive in scope with the appended claims.

For brevity in the claims, the "supervisory means" in the output system of a control tube shall be understood, when not inconsistent with the context, generically to comprehend means to operate or afford a suitable alarm, and/or to operate, or render inoperative, the regulating apparatus normally controlled by the measuring system.

What we claim is:

1. In an electrical system for measuring the magnitude or changes in magnitude of a condition, a tube, means for determining the anode circuit impedance of said tube comprising a source of voltage in the input circuit thereof and a current path which is continuous when the system is in operative condition, and supervisory means in the output system of said tube responsive to the change in anode current incident to the interruption of said path when said system becomes inoperative.

2. In an electrical system for measuring the magnitude or changes in magnitude of a condition, a tube, voltage-producing means in the input circuit of said tube, a path in shunt to said means to limit the effective voltage thereof so long as said system is in operative condition, and supervisory means in the output system of said tube responsive to change in the magnitude of said voltage when said system becomes inoperative.

3. In an electrical system for measuring the magnitude or changes in magnitude of a condition, a tube, means for determining the anode current of said tube comprising a circuit in the input system of said tube which is of low impedance so long as said system is in operative condition, and supervisory means in the output system of said tube responsive to the change in anode current.

4. In an electrical system for measuring the magnitude or changes in magnitude of a condition, a tube, means for determining the anode current of said tube comprising a circuit in the input system of said tube which is continuous so long as said system is in operative condition, and supervisory means in the ouput system of said tube responsive to the interruption of said circuit.

5. In a measuring system including a direct-current network unbalanced upon change in magnitude of a condition, a tube, means for determining the magnitude of the voltage applied to a control electrode of said tube including a source of alternating current voltage and means for non-conductively reactively connecting the input circuit of said tube to said network, and supervisory means in the output system of said tube responsive to change in magnitude of the anode current.

6. In a measuring system including a direct current network unbalanced upon change in magnitude of a condition, a tube, means in the input system of said tube for producing an alternating-current voltage, connections including capacitative reactance between said network and the input circuit of said tube providing a shunt path so long as said network is in operative condition, and supervisory means in the output system of said tube responsive upon interruption of said path.

7. In a measuring system including an electrical network unbalanced upon change in magnitude of a condition, a tube, supervisory means in the output ssytem of said tube responsive to reduction of the anode current below a predetermined value, means in the input circuit of said tube for producing a biasing voltage of such magnitude that the anode current is less than said predetermined value, and connections from said network to said input circuit to maintain the effective biasing voltage at such magnitude that the anode current is not less than said predetermined magnitude when the system is in operative condition.

8. In a measuring system including an electrical network unbalanced upon change in magnitude of a condition, a tube, supervisory means in the output ssytem of said tube responsive to reduction of the anode current below a predetermined value, a source of alternating current in the input system of said tube, and connections from said network to said input system to maintain the anode current at a value not less than said predetermined magnitude so long as said network is in operative condition.

9. In a measuring system including as components a galvanometer and means for detecting changes in magnitude of a condition, a tube, supervisory means in the output system of said tube responsive to change in magnitude of the anode current thereof, and connections for including at least one of said components in the input system of said tube to provide different magnitudes of anode current dependent upon whether or not said component is in operative condition.

10. In a measuring system including as components a galvanometer and means for detecting changes in magnitude of a condition, a tube, supervisory means in the output system of said tube responsive to change in magnitude of the anode current thereof, connections for including a portion of said system including at least one of said components in the input system of said tube, and means for disconnecting said portion of the system from the remainder thereof to effect a change in the magnitude of said anode current if said portion of the system is in an inoperative condition.

11. In a measuring system including as components a galvanometer and means for detecting changes in magnitude of a condition, a tube, supervisory means in the output system of said tube responsive to change in magnitude of the anode current thereof, connections for including a portion of said measuring system including at least one of said components in the input system of said tube to predetermine the normal anode current, and means for intermittently disconnecting said portion of the system from the remainder thereof to effect a change in the magnitude of said anode current if said portion of the system is discontinuous.

12. In an electrical system including means responsive to changes in magnitude of a condition, a tube, supervisory means in the output system of said tube responsive to change in magnitude of the anode current, and connections for including the portion of said system including said responsive means in the input system of said tube to maintain a predetermined magnitude of anode current so long as said responsive means is in operative condition.

13. In an electrical system including means responsive to changes in magnitude of a condition, a tube, supervisory means in the output system of said tube responsive to reduction of the anode current below a predetermined value, and means for normally maintaining the anode current in excess of said value comprising connections for including a portion of said system including said responsive means in the input system of said tube.

14. In an electrical system including means responsive to changes in magnitude of a condition, a tube, supervisory means in the output system of said tube responsive to reduction of the anode current below a predetermined value, means in the input system of said tube tending to establish a magnitude of anode current less than said predetermined value, and means for normally maintaining the anode current in excess of said value comprising connections for including a portion of said system including said responsive means in the input system of said tube.

15. In an electrical system including means responsive to changes in magnitude of a condition, a tube, signal means in the output system of said tube responsive to reduction of the anode current below a predetermined value, and means for normally maintaining the anode current in excess of said value comprising connections for including a portion of said system including said responsive means in the input system of said tube.

16. In an electrical system including means responsive to changes in magnitude of a condition and means normally controlled thereby to regulate the magnitude of said condition, a tube, means in the output system of said tube responsive to reduction of the anode current below a predetermined value to prevent operation of said regulating means by said responsive means, and means for normally maintaining the anode current in excess of said value comprising connections for including a portion of said system including said responsive means in the input system of said tube.

17. In an electrical system including means responsive to changes in magnitude of a condition and means controlled thereby to regulate the magnitude of said condition, a tube, means in the output system of said tube responsive to reduction of the anode current below a predetermined value to effect a predetermined operation of said regulating means, and means for normally maintaining the anode current in excess of said value comprising connections for including a portion of said system including said responsive means in the input system of said tube.

18. In an electrical system including means responsive to changes in magnitude of a condition, a tube, means for normally maintaining the anode current of said tube in excess of a predetermined magnitude comprising connections for including a portion of said system including said responsive means in the input system of said tube, and means in the output system of said tube responsive to reduction of the anode current below said predetermined magnitude to interrupt at least one of said connections.

19. A measuring system comprising a galvanometer having a member deflecting in response to changes in magnitude of a condition, means for intermittently clamping said member, mechanism for effecting adjustments in accordance with the deflections of said member, a tube, supervisory means in the output system of said tube responsive to change in magnitude of the anode current thereof, means for normally maintaining a predetermined magnitude of the anode current comprising connections for including said galvanometer in the input system of said tube, and intermittently operating switching means for disconnecting said galvanometer from the measuring system while its deflecting member is clamped.

20. A measuring system comprising a galvanometer having a deflecting member and electrical means for detecting the changes in magnitude of a condition, means for intermittently clamping said member, mechanism for effecting adjustments in accordance with the deflections of said member, a tube, supervisory means in the output system of said tube responsive to reduction of the anode current below a predetermined magnitude, means for normally maintaining the anode current in excess of said predetermined magnitude comprising connections for including said galvanometer and said detecting means in the input system of said tube, and switching means operating while said member is clamped to disconnect said galvanometer and detecting means from the remainder of the measuring system.

21. A measuring system comprising a galvanometer and a thermocouple for detecting changes in temperature, temperature-regulating means operating in response to deflections of said galvanometer, a tube, supervisory means in the output system of said tube responsive to reduction of the anode current thereof below a predetermined magnitude, and means for normally maintaining the anode current of said tube in excess of said magnitude comprising connections for including said galvanometer and said thermocouple in the input system of said tube.

22. A measuring system comprising a galvanometer and a thermocouple for detecting changes in temperature, temperature-regulating means operating in response to deflections of said galvanometer, a tube, means for normally maintaining the anode current of said tube in excess of a predetermined magnitude comprising connections for including said galvanometer and said thermocouple in the input system of said tube, and signal means responsive to reduction of the anode current of said tube below said predetermined magnitude.

23. A measuring system comprising a galvanometer and a thermocouple for detecting changes in temperature, temperature-regulating means operating in response to deflections of said galvanometer, a tube, means for normally maintaining the anode current of said tube in excess of a predetermined magnitude comprising connections for including said galvanometer and said thermocouple in the input system of said tube, and means responsive to reduction of the anode current of said tube below said predetermined magnitude for preventing operation of said regulating means by the galvanometer.

24. A measuring system comprising a galvanometer and a thermocouple for detecting changes in temperature, temperature-regulating means operating in response to deflections of said galvanometer, a tube, means for normally maintaining the anode current of said tube in excess of a predetermined magnitude comprising connections for including said galvanometer and said thermocouple in the input system of said tube, and means responsive to reduction of the anode current of said tube below said predetermined magnitude for operating said temperature-regulating means.

25. A measuring system comprising a galvanometer and a thermocouple for detecting changes in temperature, temperature-regulating means operating in response to deflections of said galvanometer, a tube, means for normally maintaining the anode current of said tube in excess of a predetermined magnitude comprising connections for including said galvanometer and said thermocouple in the input system of said tube, and means responsive to reduction of the anode current of said tube below said predetermined value to give a signal indicating inoperativeness of the measuring system and to prevent further operation of said regulating means by the galvanometer.

26. A measuring system comprising a galvanometer and a thermocouple for detecting changes in temperature, temperature-regulating means operating in response to deflections of said galvanometer, a tube, means for normally maintaining the anode current of said tube in excess of a predetermined magnitude comprising connections for including said galvanometer and said thermocouple in the input system of said tube, and means responsive to reduction of the anode current of said tube below said predetermined magnitude to give a signal indicating inoperativeness of the measuring system and to effect operation of said regulating means to establish a predetermined temperature.

27. A measuring system comprising electrical means responsive to the changes in magnitude of a condition, means for regulating the magnitude of said condition operable by said responsive means, and a supervisory system comprising a tube, means for normally maintaining the anode current of said tube in excess of a predetermined magnitude comprising connections for including said responsive means in the input system of said tube, means for supplying current to the tube circuits, and supervisory means responsive to reduction of the anode current of said tube below said predetermined magnitude incident to failure of said responsive means or of said current-supplying means.

28. A measuring system comprising electrical means responsive to the changes in magnitude of a condition, means for regulating the magnitude of said condition operable by said responsive means, and a supervisory system comprising a tube, means for normally maintaining the anode current of said tube in excess of a predetermined magnitude comprising connections for including said responsive means in the input system of said tube, means for supplying current to the tube circuits, and means responsive to reduction of the anode current of said tube below said predetermined magnitude to indicate inoperativeness of said measuring system or said supervisory system.

29. A measuring system comprising electrical means responsive to the changes in magnitude of a condition, means for regulating the magnitude of said condition operable by said responsive means, and a supervisory system comprising a tube, means for normally maintaining the anode current of said tube in excess of a predetermined magnitude comprising connections for including said responsive means in the input system of said tube, means for supplying current to the tube circuits, and means responsive to reduction of the anode current of said tube below said predetermined magnitude to prevent further operation of said regulating means by said condition responsive means.

30. A measuring system comprising electrical means responsive to the changes in magnitude of a condition, means for regulating the magnitude of said condition operable by said responsive means, and a supervisory system comprising a tube, means for normally maintaining the anode current of said tube in excess of a predetermined magnitude comprising connections for including said responsive means in the input system of said tube, means for supplying current to the tube circuits, and means responsive to reduction of the anode current of said tube below said predetermined magnitude to effect a predetermined emergency operation of said regulating means.

31. A measuring system comprising electrical means responsive to the changes in magnitude of a condition, means for regulating the magnitude of said condition operable by said responsive means, and a supervisory system comprising a tube, means for normally maintaining the anode current of said tube in excess of a predetermined magnitude comprising connections for including said responsive means in the input system of said tube, means for supplying current to the tube circuits, and switching means responsive to reduction of said anode current below said predetermined magnitude to give a signal indicating inoperativeness and to interrupt the connection between said systems until reestablished by an operator.

32. The combination with an automatic control system comprising a balanceable electrical measuring network and control means responsive to unbalance of said network, of means operative from time to time for detecting derangement of said network, and supervisory means controlled by said detecting means to assume control of said control means in event of derangement of said measuring network.

33. The combination with an automatic control system comprising a balanceable electrical measuring network, electrical means responsive to unbalance of said network, and control means controlled by said electro-responsive means, of means for detecting derangement of said network, and supervisory means controlled by said detecting means to assume control of said control means independently of said electro-responsive means in event of derangement of said measuring network.

ELWOOD T. DAVIS.
FELIX WUNSCH.